Figure 1:
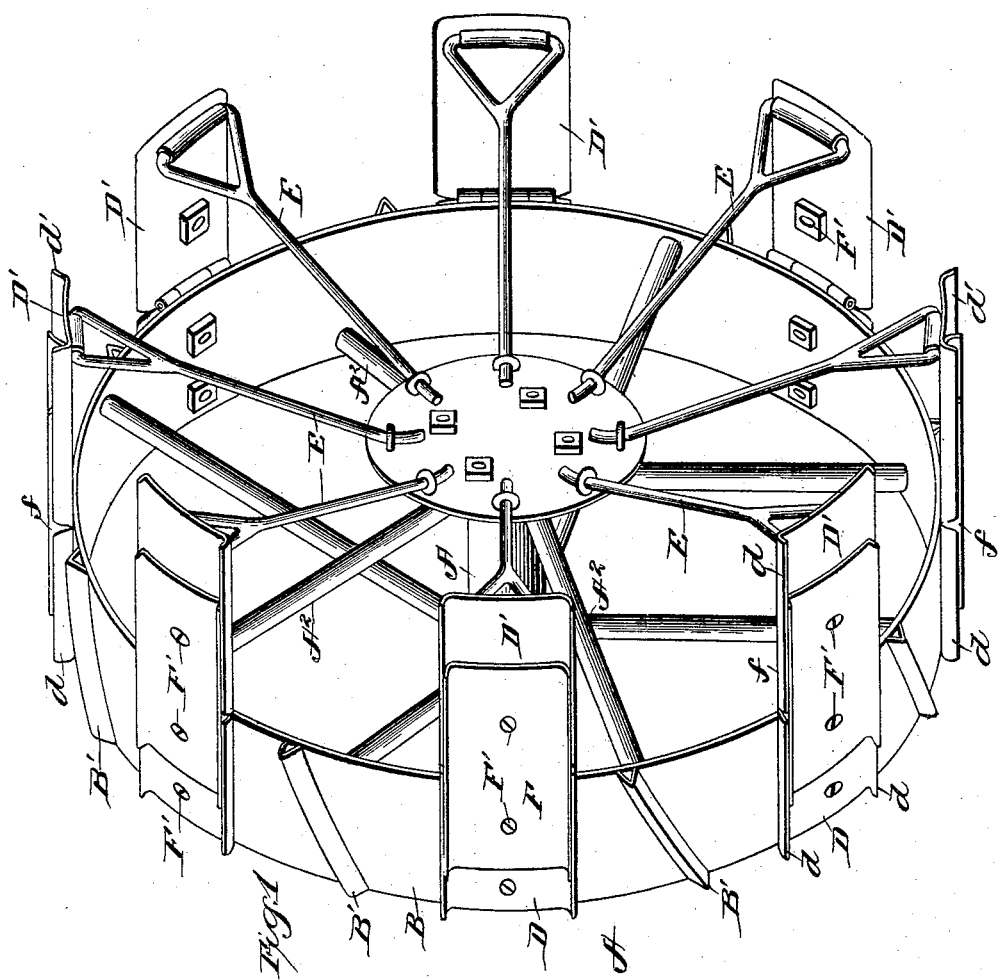

(No Model.) 2 Sheets—Sheet 1.

H. W. WAIT.
TRACTION WHEEL.

No. 489,400. Patented Jan. 3, 1893.

Witnesses Inventor
Henry W. Wait.
By his Attorneys,

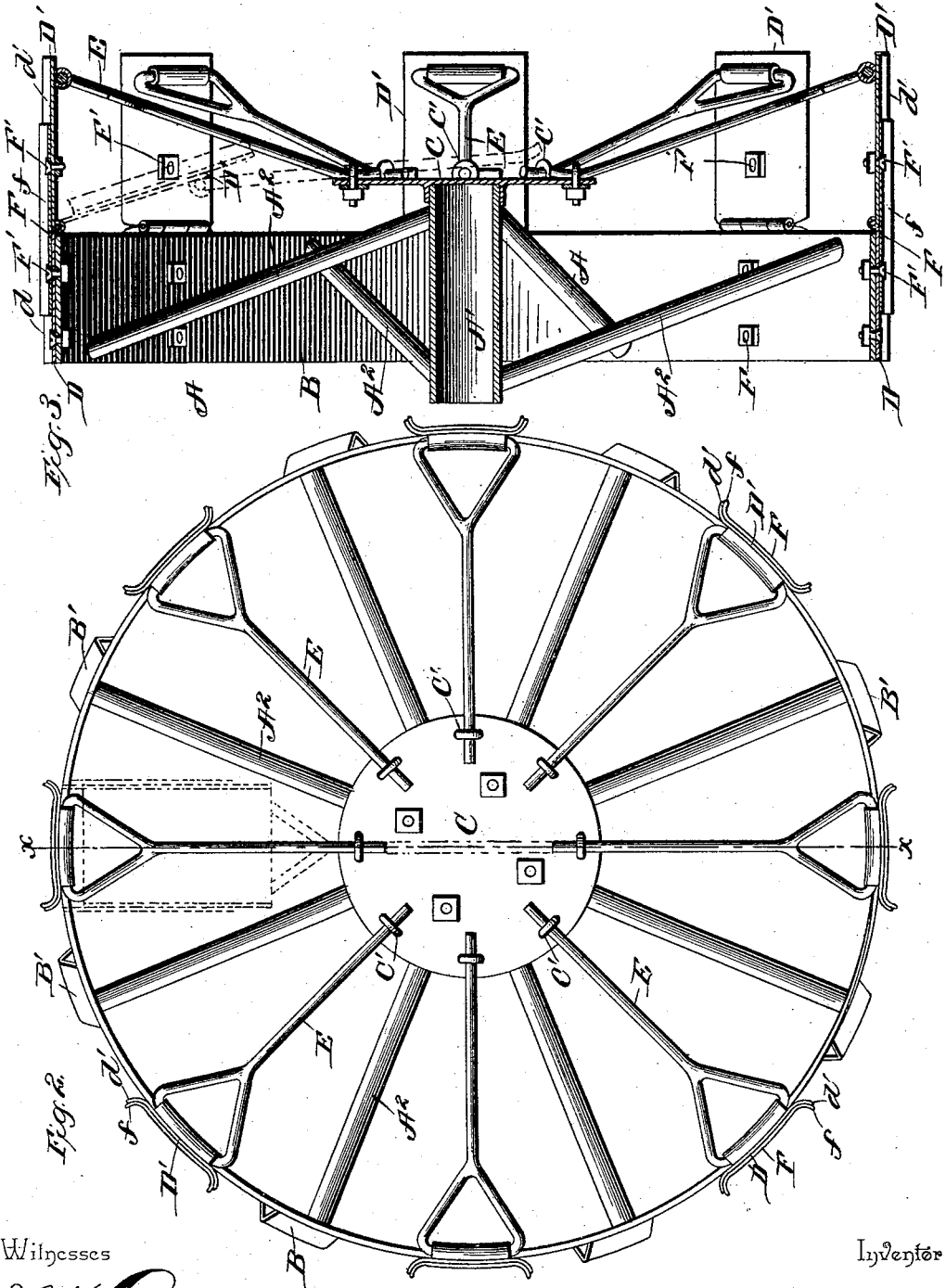

UNITED STATES PATENT OFFICE.

HENRY W. WAIT, OF LAKE CHARLES, LOUISIANA.

TRACTION-WHEEL.

SPECIFICATION forming part of Letters Patent No. 489,400, dated January 3, 1893.

Application filed March 25, 1892. Serial No. 426,376. (No model.)

*To all whom it may concern:*

Be it known that I, HENRY W. WAIT, a citizen of the United States, residing at Lake Charles, in the parish of Calcasieu and State of Louisiana, have invented a new and useful Traction-Wheel, of which the following is a specification.

My invention relates to improvements in traction wheels for engines, agricultural machines, road-wagons, or for any other purpose for which it may be applicable to use the same, and it consists of the construction and arrangement of parts as will be hereinafter more fully described and particularly pointed out in the claims.

The object of my invention is to provide a convertible traction wheel that may be readily changed from one width of tread to a broader width while the wheel is in position in connection with the axle on which it is mounted thereby adapting the wheels for use on hard or soft ground with equal efficiency.

Further advantage will be set out in the description and claims.

Referring to the drawings—Figure 1 is a perspective view of a traction wheel embodying my invention and showing the means of extending the tread of the wheel. Fig. 2 is a front elevation of the wheel. Fig. 3 is a sectional view on the line $x$—$x$ of Fig. 2.

In the drawings, A designates a wheel having a hub A', with spokes $A^2$ running therefrom to a rim B, which may be provided with suitable traction-ribs B', as is usual in wheels of this construction. On the outer end of the hub is secured a disk C, having radially-arranged eyes C' arranged near the periphery thereof for a purpose which will be hereinafter more fully explained.

Secured at intervals on the outer surface of the rim B, are plates D, to which are hinged extensions D', and to said extensions are secured guides E, which have movement in the eyes C', arranged on the disk C. As shown in Fig. 1 in full lines, the extensions D' are adapted to be held in extended position on a level with the plates D; and when it is desired to sustain said extensions in this position, plates F are bolted to plates D and rim C of the wheel and to the extensions D' by bolts and nuts F' in connection with the opposite ends of said plates F. When it is desired to turn or fold the extensions D' inward and thereby reduce the tread of the wheel to its normal width, the plates F are removed and the said operation can be readily accomplished. The plates D and extensions D', as well as the plates F, are formed with upturned edge-flanges $d$ $d'$ and $f$, which facilitate taking hold of the surface of the ground for a purpose which will be readily understood. It will be observed that the guides E also form braces for the extensions D', and have their lower ends slightly curved in order to provide a slight frictional contact with said eyes and their opposite ends formed into a suitable eye or loop for pivotal connection with said extensions D'.

A principal advantage of this invention is that the wheel can be used normally to move over ordinary ground, and the extensions to broaden the tread may be readily adjusted in position where soft or soggy ground is encountered, thereby forming a wheel with a broad tread, and reduce the inconvenience of chucking or clogging the wheel to a minimum.

This invention is also specially applicable for use in connection with agricultural machines in traveling over soft ground, such as plowed fields, or for mowers and reapers where motion is communicated to machinery through the traction wheels.

It is obviously apparent that many changes in the construction and arrangement of parts of my invention might be readily made and substituted for those described, without in the least departing from the general idea of the device.

Having thus described my invention, what I claim as new is—

1. A traction wheel having a stationary tread with an adjustable extension in connection therewith by means of which said tread may be broadened, substantially as described.

2. A traction wheel having extensions hinged to the side thereof in order to extend the tread, substantially as described.

3. A traction wheel having extensions hinged to the side of the rim thereof, combined guides and braces secured to the said extensions, and a central disk to which said combined guides and braces are movably connected, substantially as described.

4. A traction wheel having folding extensions connected to one side of the rim thereof, and means for locking said extensions in position, substantially as described.

5. A traction wheel having a rim with a series of plates thereon, extensions hinged to said plates, combined guides and braces connected to said extensions, a centrally-located disk to which said combined guides and braces are movably connected, and plates for locking said extensions in position, substantially as described.

6. A traction wheel having a rim with a series of flanged plates thereon, and folding extensions provided with edge-flanges and hinged to said plates, substantially as described.

7. A traction wheel having hinged tread-sections or plates connected therewith, substantially as described.

8. A traction wheel having a rim provided with a hinge-section to form the tread of greater width, substantially as described.

In testimony that I claim the foregoing as my own I have hereto affixed my signature in the presence of two witnesses.

HENRY W. WAIT.

Witnesses:
DOSITE VINCENT,
P. A. BOURG.